May 9, 1933.    M. MALLORY    1,908,551
FUEL AND SPARK CONTROL FOR INTERNAL COMBUSTION MOTORS
Filed March 7, 1931
Fig. 1.
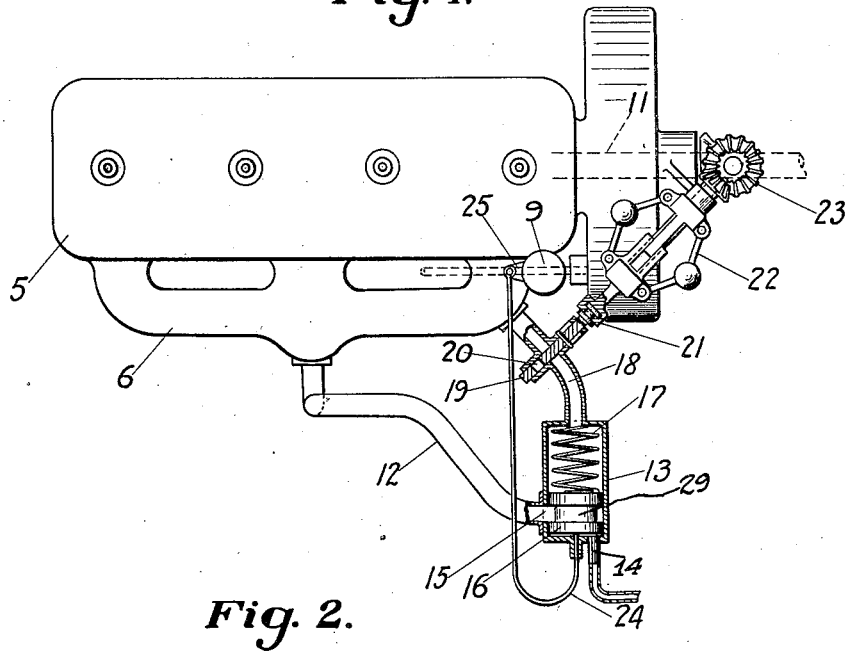
Fig. 2.
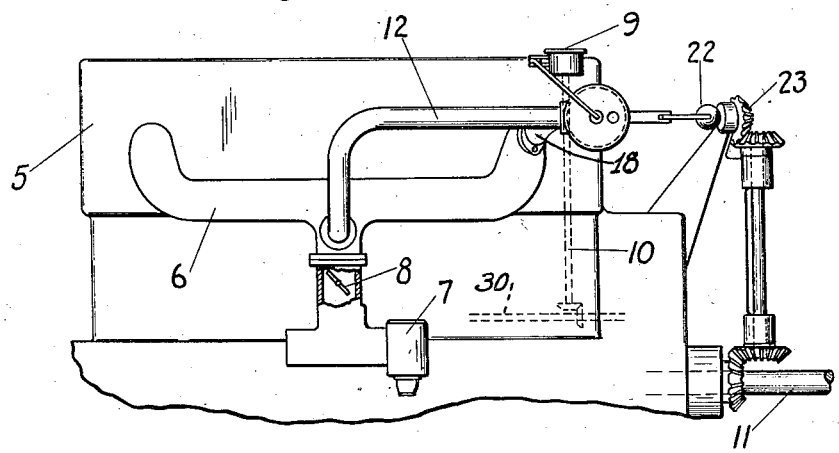
Fig. 3.    Fig. 4.
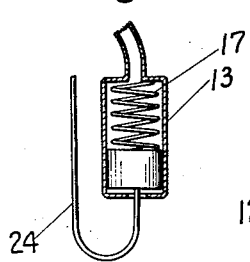 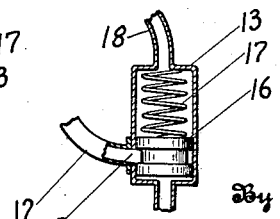
Inventor
Marion Mallory
Owen & Owen
Attorneys Patented May 9, 1933

1,908,551

UNITED STATES PATENT OFFICE

MARION MALLORY, OF TOLEDO, OHIO, ASSIGNOR TO THE MALLORY RESEARCH COMPANY, A CORPORATION OF DELAWARE

FUEL AND SPARK CONTROL FOR INTERNAL COMBUSTION MOTORS

Application filed March 7, 1931. Serial No. 520,811.

This invention relates to fuel and spark control of internal combustion motors, due allowance being made for varying conditions such as the speed of operation, the load and the position of the throttle valve.

In a motor of the usual construction, when running at high speed with little or no load, if the throttle is suddenly closed, a high degree of vacuum or suction is developed in the intake manifold, which draws in a considerable amount of gas through the opening normally provided to permit idling of the motor, without sufficient air supply under such conditions to form a proper mixture. Such increased vacuum in the intake manifold also results in a decreased compression in the cylinders and makes it desirable to advance the timing of the spark when the motor is operating at a moderate or high speed but not when the motor is idling.

With the above facts in mind, it is an object of the present invention to provide an increased supply of air to the manifold when the motor is operating above a predetermined speed with the throttle partly or wholly closed. This not only relieves the vacuum in the manifold and increases the compression in the cylinders but also conserves gas.

Another object is to provide pressure controlled means for advancing or retarding the timing of the spark in accordance with the speed of the motor and the load imposed thereon. In other words, in accordance with the present invention, the spark is advanced whenever the compression is materially reduced in the cylinders, until such time as the speed of the motor approaches the idling point.

The invention consists further in novel features of construction and combinations of elements, the advantages of which will be more particularly described in connection with the accompanying drawing, in which—

Figure 1 is a plan view, with parts in section, showing the invention as applied to an internal combustion motor;

Figure 2 is a side elevation of the same;

Figure 3 is a sectional view illustrating a modified form of the invention for controlling the timing of the spark in accordance with the compression and the speed; and Figure 4 is a sectional view illustrating a modified form in which a supply of air to the manifold for increasing the compression is controlled in accordance with the speed.

The invention is associated with an internal combustion motor 5 having an intake manifold 6, carburetor 7, throttle valve 8 and a timer 9 driven through the medium of a shaft 10 from the cam shaft 30 of the motor.

In carrying out my invention, an air supply pipe 12 is connected with the inlet manifold 6. A cylinder 13 is connected to the outer end of the pipe 12 and, as shown in Figs. 1 and 4, has an air inlet opening 14 and a port 15 leading into the pipe 12. A valve in the form of a piston 16 within the cylinder 13 is normally held by a spring 17 in position to close the port 15. The end of the cylinder containing the spring 17 is connected by a pipe 18 to the manifold 6 at an appreciable distance from the connection of the pipe 12. A valve 19 is adapted to close the passageway through the pipe 18 when the motor is at rest or idling. When the speed of the motor increases to a predetermined point, however, the valve 19 is opened, as for example, by being moved to a position in which the opening 20 registers with the passageway through the pipe 18. If the opening 14 is connected by a pipe to the breather opening in the crank case, sufficient oil vapor will be thus supplied to lubricate the piston 16.

In order to control the position of the valve 19 in accordance with the speed of the motor, the end of the valve, in the present instance, has a swivel connection 21 with a centrifugal governor 22 which may be connected by suitable gearing 23 to the crank shaft 11, or may be a part of the timer. Thus it will be seen that, when the motor attains a predetermined speed the governor 22 will open the valve 19. When the motor is operating at or above this predetermined speed, if the throttle valve is wholly or partly closed, as for example when the motor is operating under little or no load or when the speed of motor is decreased, there is a tendency to immediately increase the degree of vacuum in the manifold 6. Such vacuum however, if the valve 19 is open, is sufficient to overcome the tension of the spring 17 and to move the piston 16 to uncover the port 15 and admit air into the manifold to reduce the vacuum. Owing to the weight of the piston or valve 16 and the distance between the points where the pipes 12 and 18 are connected to the manifold, there is little tendency for the valve 16 to flutter as the vacuum in the manifold is relieved through the ports 14 and 15. The piston 16 is preferably formed with a circumferential channel 29 adjacent the port 15 to prevent the piston from sticking by reason of the suction through the pipe 12.

Whenever a higher vacuum occurs in the manifold 6, it results in a decreased compression in the cylinders and it is desirable at such time to advance the timing of the spark. For this purpose, in the form of the invention illustrated in Figs. 1 and 3, a rod 24 connects the piston 16 with the spark lever 25 so that whenever a higher vacuum occurs in the manifold 6, resulting in decreased compression in the cylinders, if the speed of the motor is sufficient to open the valve 19, the spark is advanced. If the motor, however, is near idling speed, the valve 19 will not be opened and the spark will not be advanced. Thus the timing of the spark is controlled in such a manner as to produce the greatest efficiency in the operation of the motor.

In the modification shown in Fig. 3 the timing of the spark is controlled in accordance with the compression and the speed of the motor without providing an auxiliary supply of air to the manifold.

In the modification shown in Fig. 4, the auxiliary supply of air to the manifold is provided, in accordance with the speed of the motor and the piston of the throttle valve, without regard to the timing of the spark.

While I have shown and described various adaptations of my invention, it is apparent that the structural details thereof may be changed considerably without departing materially from the salient features of the invention as claimed. It is also obvious that the vacuum controlled valve, as well as the centrifugal governor, may be incorporated as a part of the distributor.

What I claim is:

1. In an internal combustion motor, the combination with the intake manifold and the ignition, of means dependent upon a predetermined speed of the motor and upon the presence of a predetermined degree of vacuum in said manifold to admit air directly to said manifold and at the same time to advance the timing of the ignition.

2. In an internal combustion motor, the combination with the intake manifold and the ignition, of an air conduit leading directly into said manifold, a valve normally closing said conduit, means to open said valve only upon the occurrence of a predetermined degree of vacuum in said manifold and a predetermined speed of the motor, and means operable in conjunction with the opening of said valve to advance the timing of the ignition.

3. In an internal combustion motor, the combination with the intake manifold and the ignition, of a passageway leading into said manifold, a valve in said passageway, means for opening said valve only when the motor exceeds a predetermined speed, an air supply conduit leading to said manifold, a valve controlling the passage through said conduit and adapted to be opened by a predetermined degree of vacuum in said manifold but subject to the influence of said vacuum only when the first mentioned valve is open.

4. In an internal combustion motor, the combination with the intake manifold and the ignition, of a passageway leading into said manifold, a valve in said passageway, means for opening said valve only when the motor exceeds a predetermined speed, a member shiftable, when under the influence of a predetermined degree of vacuum in the manifold, to advance the timing of the ignition and to admit additional air to the manifold, said member being subject to the influence of conditions in the manifold only when said valve is open.

5. In an internal combustion motor, the combination with an intake manifold, of an air supply passageway leading into said manifold, a valve normally closing said passageway, a second passageway leading into the manifold at a distance from the first passageway, and means for causing said valve to be opened by suction through said second passageway only when the motor is operating above a predetermined speed and when there occurs a predetermined vacuum in the manifold.

6. In an internal combustion motor, the combination with an intake manifold, of an air supply passageway leading into said manifold, a valve normally closing said passageway, a second passageway leading into the manifold at a distance from the first passageway, a valve adapted to close the second passageway, and means actuated upon the attainment of a predetermined speed by the motor to open the valve in the second passageway and subject the valve in the first passageway to the influence of suction from the manifold, the valve in the first passageway being then movable to open position when a predetermined vacuum occurs in the manifold.

7. In an internal combustion motor, the combination with the intake manifold, of a valve casing having upper and lower ports adapted to communicate with said manifold, a reciprocable valve normally covering the lower port but operable by suction through the upper port to uncover the lower port, a second valve controlling communication between the upper port and the manifold, and means dependent upon the speed of the motor to determine the position of said second valve.

8. In an internal combustion motor, the combination with the intake manifold, of an air supply passageway leading into said manifold, a valve normally closing said passageway, means operable by a predetermined suction from the manifold to open said valve, means rendering said first mentioned means inoperable except when the motor is operating above a predetermined speed, and means connected with said valve to advance the spark when said valve is opened.

9. In an internal combustion motor, the combination with the intake manifold, of an air supply passageway leading into said manifold, a valve normally closing said passageway, a second passageway leading into the manifold at a considerable distance from the first passageway, and means dependent upon the speed of the motor for causing said valve to be opened by a predetermined suction through said second passageway.

10. In an internal combustion motor, the combination with the intake manifold, of a valve casing having upper and lower ports adapted to communicate with said manifold, and a reciprocable valve normally covering the lower port but operable by suction through the upper port to uncover the lower port, said valve having a peripheral groove in communication with said passageway when the valve is closed.

In testimony whereof I have hereunto signed my name to this specification.

MARION MALLORY.